Sept. 30, 1947.  A. E. HOUSE  2,428,161

WELDING EQUIPMENT

Filed Aug. 28, 1945

INVENTOR
ALBERT ERNEST HOUSE

*Ernest E Carver*
ATTORNEY

Patented Sept. 30, 1947

2,428,161

UNITED STATES PATENT OFFICE 2,428,161

WELDING EQUIPMENT

Albert Ernest House, West Vancouver, British Columbia, Canada

Application August 28, 1945, Serial No. 613,130

4 Claims. (Cl. 219—8)

My invention relates to improvements in welding equipment.

Devices have been devised for causing a welding machine to travel along girth seams around the outside of irregular bodies and also to support a welding machine upon a boom extending through a central manhole of a cylindrical body, so that on rotation of the body at a regular rate of speed the seam would be progressively made. None of these devices were capable of welding a similar seam within a body which was irregular in peripheral wall contour or in which access to the seam was through an opening which was not centrally disposed in the head of said body.

The object of the invention is therefore to provide means whereby self propelling welding machines may be utilized for welding girth seams around the interior of cylindrical, oval or irregularly curved bodies. A further object is to provide means where such welding machine may be used to weld within cylindrical or irregularly curved bodies in which the manhole or opening through which the welding machine must be inserted is so placed in a head or side wall of the body that the machine cannot be supported except upon its own wheels.

Referring to the drawings.

In the drawings like characters of reference indicate corresponding parts in each figure.

Figure 1:
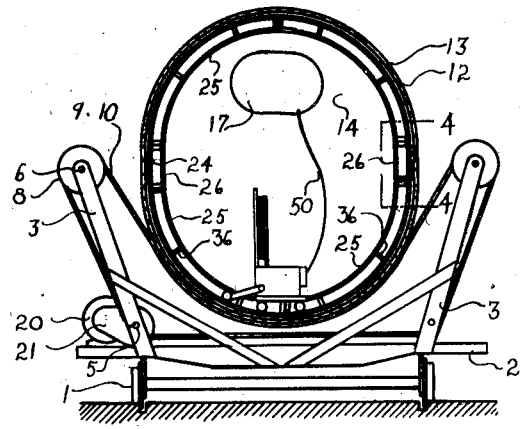
Fig. 1 is an elevational view of the invention showing the body to be welded in section.

The numeral 1 indicates generally a flat car having a platform 2 upon which side frames 3 are erected, each side frame is fitted with horizontal shafts 5 and 6 having chain sprockets 8. The sprockets 8 are spaced longitudinally of the frame to support two or more drive chains 9, one only shown, which chains are adapted to cradle in their upper runs 10 a hollow body having girth seams to be welded. The hollow body shown as indicated by the numeral 12 is substantially oval in form and consists of a side wall 13 and end walls 14 and 15. The wall 14 is provided with a manhole 17 which is remote from the centre of the body. A reversible motor 20 is mounted on the platform 2 of the flat car 1 and is connected to one of the shafts 5 through a suitable reduction gear 21 to drive the shafts and chains and rotate the hollow body 12 at welding speed.

A track generally indicated by the numeral 24 is built up of sections 25 and 26, each of which consists of T rails 28, 29 and 30 connected together by transverse members 32. The members 32 which are adjacent the ends of any two sections are connected together by cleats 34 and bolts 35, thus holding the sections in place. Vertical members 36 are provided at the sides of the track 24 to support guard rails 37, one only shown, for the purpose of preventing the derailment of the welding machine 39 in case of accident during operation. The track 24 is spaced and supported from the inner periphery of the wall 13 by set screws 41 passing through the transverse members 32, these set screws also secure the track against slippage within the body 12.

Figure 2:
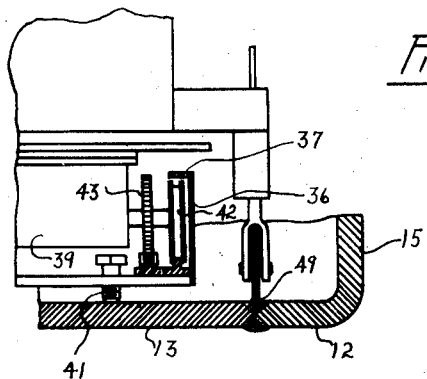
Fig. 2 is an enlarged fractional transverse view of the welding machine track.
Figure 3:
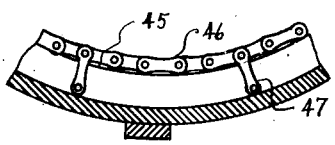
Fig. 3 is a detail view of the preferred type of toothed rack through which the welding machine obtains its drive.
Figure 4:
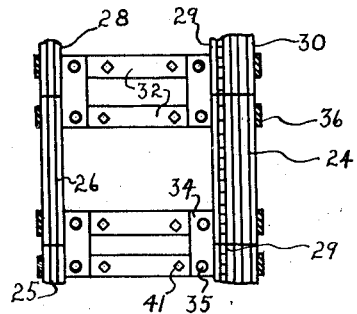
Fig. 4 is a detail view of the jointing of the track sections.

The welding machine 39 may be of any make and would be provided with track wheels 42 and a drive sprocket 43, the track wheels ride on the rails 28 and 30 and the sprocket is adapted to engage a toothed rack 45, see detail in Figure 3. This rack consists of a sprocket chain 46 which rests upon the T rail 29 and is held thereto and against endwise movement by links 47 secured to the T rail. The machine 39 thus mounted upon the track is capable of making its weld in absolute alignment with the girth seam 49 shown in Figure 2. The electric cable 50 to the machine obviously leads through the manhole 17 and connects to a suitable control system and a source of current supply.

In operation, the track 24 is set parallel to any girth seam to be welded and the welding machine is set upon its track in the position shown, where the machine is perfectly vertical and the pool of molten metal caused by the arc of the machine is at the lowest part of the seam groove. The machine is equipped with a pendulum which is included in the control of the machine driving motor and the motor 20 so that any swing of the pendulum will cause the motor 20 to so vary the speed of rotation of the body that the machine will return to its normal position or cease to increase its inclination from the horizontal. The control is such as to stop the rotation of the motor as soon as the machine attains a perpendicular position and if a reverse curve is encountered causing the pendulum to swing in an opposite direction to that previously referred to, the motor 20 will operate to turn the drum in an opposite direction also. It will be realized that the welding machine motor is not controlled automatically but operates to drive the machine forward along its track at a constant speed. The control system employed does not form part of the invention and description of its parts is not considered necessary. As the hollow body turns the cable will obviously slip around the manhole and when one seam is made the track 24 will be moved bodily towards the next seam to be welded.

What I claim as my invention is:

1. Welding equipment for the welding of an inside girth seam in a hollow body comprising a support for the body having means for moving the body in the direction of the seam and a track conforming to the inner contour of the seam to support a welding machine inside said body, said track being secured to the inner periphery of the body adjacent said seam.

2. Welding equipment for the welding of an inside girth seam in a hollow body comprising a support for the body having means for moving the body in the direction of the seam and a track conforming to the inner contour of the seam, said track serving to support a welding machine inside said body, said track being formed of sections adapted to be connected in end to end relation and to be mounted within the body to support a welding machine adjacent the seam to be welded.

3. Welding equipment for welding a girth seam within a hollow body comprising a support for rockingly supporting the body transversely of the seam, a track conforming to the inner contour of the body, said track serving to support a welding machine within the body adjacent the seam.

4. Welding equipment for welding a girth seam in a hollow body comprising a support having side frames, a plurality of flexible members extending in looped formation between the frames to cradle the hollow body, means for imparting endwise movement to the flexible members to rock said body, a track conforming to the contour of the seam mounted within the body, said track serving to support a welding machine.

ALBERT ERNEST HOUSE.

REFERENCES CITED

The following references are of record in the file of this patent:

UNITED STATES PATENTS

| Number | Name | Date |
| --- | --- | --- |
| 2,305,163 | House | Dec. 15, 1942 |
| 1,846,470 | Burnish | Feb. 23, 1932 |
| 2,016,043 | Lincoln | Oct. 1, 1935 |
| 2,259,976 | Howard | Oct. 21, 1941 |